March 25, 1952 — E. L. FOSTER — 2,590,305
HYDRAULICALLY CONTROLLED CONTINUOUSLY
VARIABLE RATIO TORQUE CONVERTER
Filed June 24, 1949 — 2 SHEETS—SHEET 1
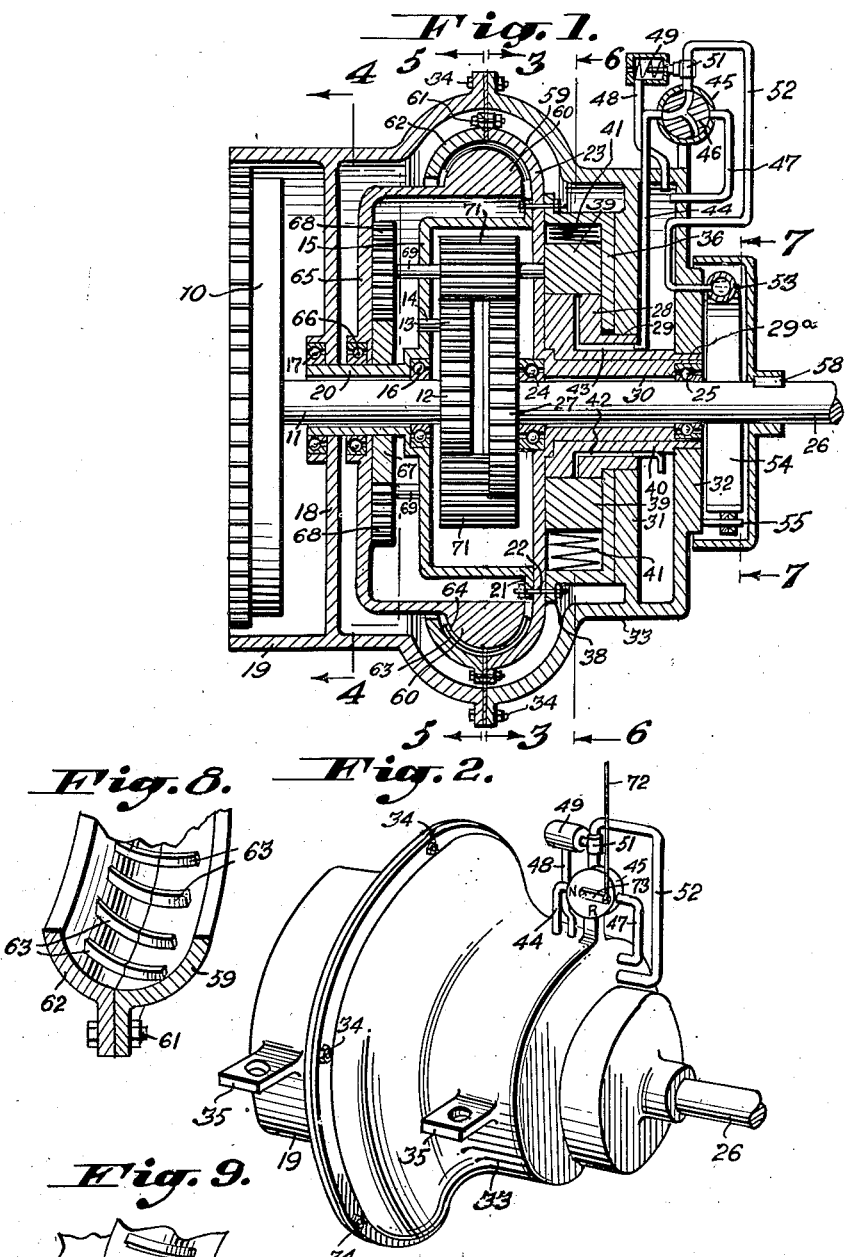
INVENTOR.
Emery L. Foster March 25, 1952 E. L. FOSTER 2,590,305
HYDRAULICALLY CONTROLLED CONTINUOUSLY
VARIABLE RATIO TORQUE CONVERTER
Filed June 24, 1949 2 SHEETS—SHEET 2

Inventor
Emery L. Foster
By John N. Randolph
Attorney

Patented Mar. 25, 1952

2,590,305

UNITED STATES PATENT OFFICE 2,590,305

**HYDRAULICALLY CONTROLLED CONTINU-
OUSLY VARIABLE RATIO TORQUE CON-
VERTER**

Emery L. Foster, Raytown, Mo.

Application June 24, 1949, Serial No. 101,186

5 Claims. (Cl. 74—794)

This invention relates generally to torque transmissions and converters and more particularly to a hydraulically controlled automatic clutch and transmission for motor cars, trucks, and the the like motorized conveyances.

An object of the present invention is to provide a torque converter of the aforedescribed character having fewer parts and requiring less space than similar converters heretofore devised for the purpose while also providing continuously variable ratio torque conversion for both forward speeds and reverse.

Another object resides in the provision of a hydraulically controlled automatic clutch and transmission which requires only one set of planetary or epicyclic gears to provide variable ratio torque conversion for both forward and reverse speeds and maintains the gears in mesh for all speeds forward and reverse and also while no torque is being delivered to the drive shaft of a machine or to the propeller shaft and the drive wheels of a vehicle, as the case may be.

A further object is to provide an automatic torque converter for transmission of power between a drive shaft and a driven shaft having a hydraulic driving connection therebetween and continuously meshed gears for continuously varying the ratio of torque conversion therebetween.

Still another object is to provide a fluid driven clutch and transmission or torque converter for a motor vehicle wherein "creeping" of the vehicle during idling of the motor is prevented under control of fluid pressure developed by the converter as the motor idles.

Still a further object is to provide fluid pressure means effective to develop sufficient pressure to prevent "creeping" of the vehicle during idling of the vehicle motor and also effective to reduce the fluid pressure in response to centrifugal force applied thereto as the motor speed is increased to move the vehicle, thereby to avoid unnecessary pressure on the fluid and resulting heating and short life thereof.

Still other objects, features and advantages of the present invention will become more fully apparent as the description proceeds, reference being had to the accompanying drawings wherein:

Figure 1 is a vertical sectional view of the torque converter of the present invention taken in the plane of the drive and driven shafts thereof;

Figure 2 is a view in perspective of the torque converter in its entirety;

Figure 3:
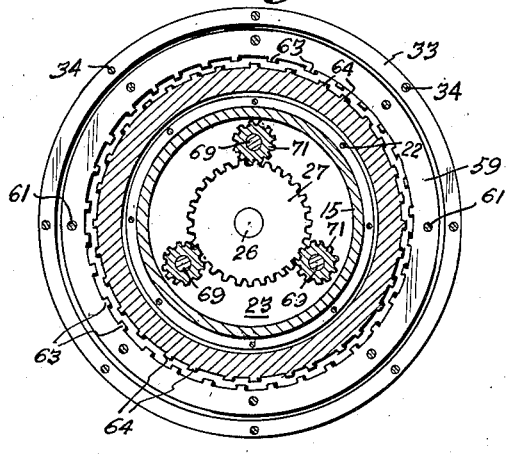
Figure 4:
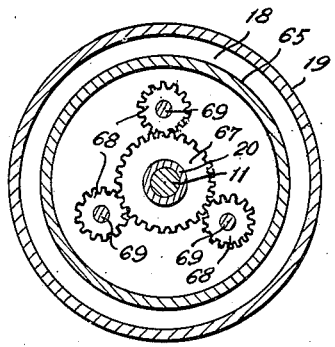
Figure 5:
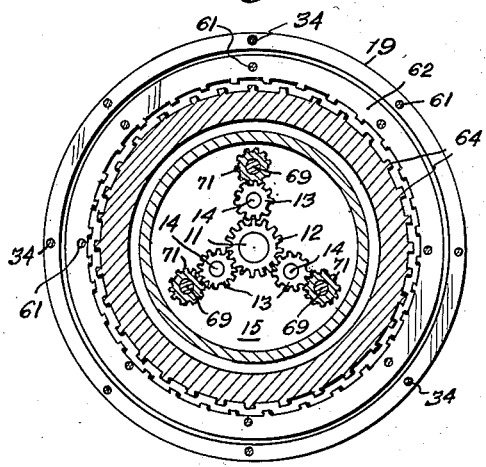
Figure 6:
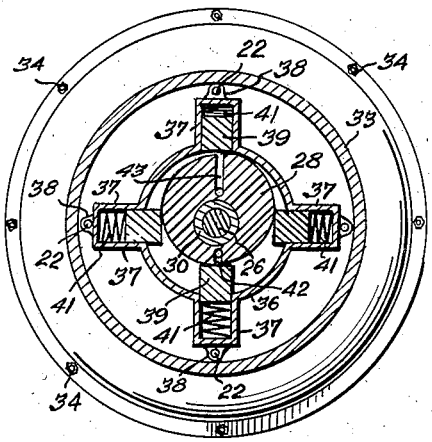
Figure 7:
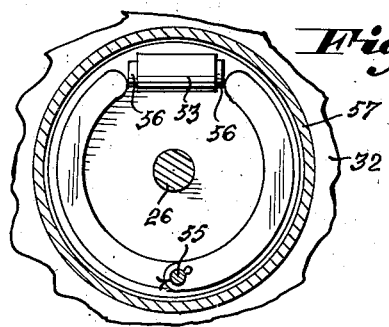

Figures 3, 4, 5, 6 and 7 are sectional views taken along the lines 3—3, 4—4, 5—5, 6—6 and 7—7, respectively, of Figure 1, and Figures 8 and 9 are views in perspective illustrating fragmentary portions of the primary and secondary rotors, respectively.

Referring now to the drawings wherein like numerals of reference are employed to designate like parts throughout the several views, 10 denotes a flywheel which may be secured to the crankshaft of a motor vehicle or to some other power shaft in any well known manner. The flywheel has a shaft 11 secured thereto and the shaft, in turn, has a gear 12 secured thereto for rotation therewith. Gear 12 meshes with a cluster of idler gears 13 which are rotatively supported on stub shafts 14 secured to the side wall of a cup-shaped rotatable casing member 15.

Casing member 15 has a hub portion 20 which carries on its inner end a bearing 16 for rotatively supporting shaft 12 and which on its outer end is journaled in a bearing 17 carried by the inwardly extending flange 18 of the forward or left end 19 of the fixed transmission housing.

Casing member 15 also has a flange 21 by means of which it is secured as by screws or bolts 22 to its cover plate 23 which also comprises a hub portion 30 which carries bearings 24 and 25 at its inner and outer ends, respectively. These bearings serve to rotatively support the driven or propeller shaft 26 which extends within the rotatable casing or carrier 15—23 and terminates therein in a gear 27 which is secured to shaft 26 for rotation therewith.

The hub portion 30 of casing cover plate 23 is journaled in the hub portion 40 of an eccentric cylinder 28, the hub portion of the latter being press fit as at 29 and 29a within the inwardly extending spaced flanges 31 and 32, respectively, of the rear or right end 33 of the fixed transmission housing.

The transmission housing may be formed in any shape suitable for the purpose, the ends 19 and 33 generally being of cylindrical configuration with arcuately formed outwardly extending complementary flange portions which are secured together as at 34 by bolts, screws, or the like. The transmission housing also preferably is provided with apertured lugs 35 for mounting the transmission on the vehicle frame or similar support therefor.

The side wall of the casing 36 of a fluid pump is disposed for rotation between the housing flange 31 and the eccentric cylinder 28. The casing 36 comprises a plurality of rectangular cyliders forming radial projections 37, Figure 6, to which are secured lugs 38 for fastening casing 36 as by screws 22 of the cover plate 23 for rotation therewith.

Each cylinder 37 has a piston 39 slidably arranged therein and a coil spring 41 for yieldably urging the piston against the peripheral surface of the eccentric cylinder 28, the cylinders 37, pistons 39 and eccentric cylinder 28 comprising the aforementioned fluid pump which, as the pistons rotate with the cylinders 37 about the eccentric and move radially within the cylinders, draws fluid such, as for example, as a suitable oil from the sump or reservoir formed between the housing flanges 31 and 32 inwardly of the pump by way of the inlet port 42 which extends from the sump through the hub portion 40 and thence radially of the eccentric cylinder 28 to the peripheral surface thereof. Similarly, an outlet port 43 extends from the peripheral surface of the eccentric radially inwardly thereof and thence through the hub portion 40 to the sump where it makes connection with an oil pipe or conduit 44 which extends outwardly of the sump to the casing 45 for a two way rotary valve 46.

A second pipe 47 in communication with the oil in the sump extends to valve casing 45 and makes connection therewith in diametrically opposed relation to pipe 44. Similarly, a third oil pipe 48 extends from the sump to a spring actuated relief valve 49 which is connected as at 51 into a pipe line 52 which extends from valve casing 45 at a point thereon intermediate pipes 44 and 47 into the sump and thence outwardly thereof through the housing flange 32 where it makes connection with the hydraulic brake cylinder 53.

A conventional hydraulic brake system, comprising the shoes 54 which are pivotally connected as at 55 and urged outwardly by the hydraulic brake pistons 56, is employed to lock the propeller shaft 26 to the fixed housing 19—33 when the vehicle motor is idling, thereby to prevent "creeping" or rolling of the vehicle when the same is standing on a grade before a stop light, for example.

To this end, the brake cylinder 53 is mounted on the housing flange 32 at the rear of the transmission and the shoes 54 are arranged to engage the inner peripheral surface of a drum 57 which is secured to the propeller shaft 26 in any suitable manner, as by the key 58. This brake system is not intended to supplement the vehicle brake system or to be connected to it in any way, but merely to relieve the driver of the necessity of applying the foot or emergency brake when the vehicle tends to creep or roll while the vehicle motor is idling, all in a manner more fully to appear hereinafter in the description of the operation of the device.

The rotatable casing cover plate 23 has a rounded lip portion 59 which terminates in a flange by means of which it is secured as at 61 to the similar flange of a complementary rounded annular member 62, the cover portion 59 and annular member 62 together comprising a primary rotor which is arranged to drive an annularly formed coacting secondary rotor 60 by means of the fluid connection therebetween. To this end, housing 19—33 is filled with a suitable driving fluid such as oil and the primary and secondary rotors preferably are provided with coacting projections 63 and 64, respectively, or other suitable arrangement of slots, louvers or the like for forcing oil from the primary rotor onto the peripheral surface of the secondary rotor 60 to produce a fluid driving connection therebetween as the speed of rotation of the primary rotor is increased.

The secondary rotor 60 has a flange portion 65 which is supported for rotation on the casing hub portion 20 as by a bearing 66. A sun gear 67 is secured to flange portion 65 for rotation with the secondary rotor 60 and meshes with a plurality of planetary gears 68 which are secured to shafts 69 for rotation therewith, shafts 69 being journaled in the rotatable casing or carrier 15—23. A plurality of planetary gears 71 are secured to shafts 69 for rotation therewith within the casing 15—23 and these gears are meshed with the idler gears 13 and driven gear 27.

In the operation of the aforedescribed automatic clutch transmission, the two way valve 46 is positioned as in Figure 1, when it is desired to idle the vehicle motor or to move the vehicle forward upon increasing the speed of the vehicle motor, the valve being positioned as by a lever 72 and crank arm 73 to the neutral position designated N in Figure 2. In this position of the valve, oil pressure is applied to the brake cylinder 53 from the oil pump 28—37—39 by way of oil pipes or tubes 44 and 52 as the pump casing 36 and pistons 39 rotate about the eccentric cylinder 28 with the rotatable casing 15—23.

The casing 15—23 is caused to rotate in the same direction with drive shaft 11 when no torque is being delivered to the propeller shaft, i. e. when the vehicle motor is idling. Assuming clockwise rotation for shaft 11, the idler gears 13 are driven counterclockwise and the planetary gears 71 are driven clockwise whereupon they are caused to roll clockwise around the sun gear 27, thereby to move the casing 15—23 clockwise. Likewise, planetary gears 68 are caused to rotate about the sun gear 67, the secondary rotor secured thereto being stationary.

As the motor speed is increased to apply power to the propeller shaft 26, the gear casing 15—23 is rotated faster whereupon a fluid driving connection is developed between the primary and secondary rotors 59—62 and 60, respectively, thereby causing the secondary rotor to also rotate clockwise. As the speed of the secondary rotor is caused to approach that of the primary rotor, the planetary gears 68, and therefore also planetary gears 71, are caused progressively to reduce in speed relative to their sun gears 67 and 27, respectively, whereupon the sun gear 27 is also moved clockwise at progressively increased speed as the torque required to move the vehicle becomes progressively less until the rotors 59—62 and 60, drive and driven shafts 11 and 26, and casing 15—23 all rotate at the same speed, at which time there is no relative rotation between the gears, i. e., the drive from the drive shaft 11 to the propeller shaft 26 now being direct.

As the speed of casing 15—23 and its associated pump casing 36 is increased, the pistons 39 in response to the centrifugal force thereon move away from the surface of the eccentric cylinder 28 whereby needless pumping of oil is avoided and the pressure of the oil in brake cylinder 53 is relieved thereby to release the brake shoes from drum 57 and thus free the propeller shaft. When the pistons move away from the surface of eccentric cylinder 28, inlet and outlet ports 42 and 43, respectively, are placed in direct fluid communication whereby the oil pressure in lines 44 and 52 is reduced to the pressure of the oil in the sump whereupon the brake system is released in a manner analogous to release of the wheel brakes on an automotive vehicle when pressure is withdrawn from the brake foot pedal. In the event that too great a pressure is developed by the pump and applied to the brake cylinder 53 before the pistons respond to the centrifugal force thereon, the excess pressure is bled off through the valve 49 and the fluid returned to the sump through oil line 48. This arrangement also has the advantage of preventing such increase in pressure as would stop rotation of casing 15—23, in which case the motor could not idle.

When the speed of the vehicle motor is reduced to idling speed the pistons 39 return under pressure of the springs 41 to again follow the peripheral surface of the eccentrically mounted cylinder 28, the arrangement of the pistons in the cylinders or guides 37 being such, or suitable retarding means being provided, that the brake system 53—56—57 does not become fully effective to lock the propeller shaft until the vehicle motor reaches idling speed.

When it is desired to move the vehicle in reverse, valve 46 is adjusted to or near its reverse position indicated at R in Figure 2, the valve in this position interconnecting the outlet pipe or tube 44 with the return pipe or tube 47 and tube 52 whereby the brake is released, the oil pumped being merely returned to the sump without building up any fluid pressure as the pump casing 36 is rotated, or, thereafter, the flow of fluid may be retarded to a varying extent by partial or complete closure of the exhaust pipe 47. When this occurs, pressure between the stationary eccentric cylinder 28 and pump casing 36 is developed to a point where rotation of the pump casing, and therefore also casing 15—23, is retarded or brought to a standstill whereupon rotation of planetary gears 71 in the clockwise direction causes rotation of the driven gear 27 and propeller shaft 26 in the counterclockwise or reverse direction, the reverse drive thus also being variable in the ratio of torque conversion from the drive shaft to the propeller shaft as the casing 15—23 and pump casing 36 are progressively reduced in speed.

From the foregoing it should now be apparent that a hydraulically controlled variable ratio torque converter has been provided which is well adapted to accomplish the aforestated objects of the present invention and, whereas a satisfactory embodiment thereof has been disclosed for practicing the principle thereof, I desire to cover all such additional embodiments and modifications thereof commensurate with the spirit and scope of the appended claims.

What I claim is:

1. A torque converter of the character disclosed comprising, in combination, coaxially arranged drive and driven shafts each having a sun gear secured thereto for rotation therewith, coacting primary and secondary rotors arranged for rotation about the axis of said shafts having adjacently disposed coacting fluid gripping surfaces, a quantity of driving fluid, casing means for rotatively supporting said shafts and submerging said rotors in said quantity of fluid whereby a fluid connection is developed therebetween as the speed of rotation of the primary rotor is progressively increased, a sun gear carried by the secondary rotor, a first planetary gear rotatively supported on the primary rotor and arranged in meshed engagement with the sun gear on said driven shaft, an idler gear rotatively supported on the primary rotor and interposed between said first planetary gear and the drive shaft sun gear in meshed engagement therewith, and a second planetary gear secured to said first planetary gear and arranged in meshed engagement with said rotor sun gear.

2. A torque converter of the character disclosed comprising, in combination, coaxially arranged drive and driven shafts, coacting primary and secondary rotors arranged for rotation about the axis of said shafts and having adjacently disposed coacting fluid gripping surfaces for developing a fluid driving connection therebetween in response to an increase in the speed of rotation of the primary rotor, a quantity of driving fluid, casing means for rotatively supporting said shafts and submerging said rotors in said quantity of driving fluid, a plurality of sun gears secured respectively to said shafts and to the secondary rotor for rotation therewith, at least one planetary gear rotatively supported on the primary rotor and arranged in meshed engagement with the sun gear individual to said driven shaft, an idler gear rotatively supported on the primary rotor and interposed between said planetary gear and said drive shaft sun gear in meshed engagement therewith, a second planetary gear secured to said first named planetary gear for rotation therewith and arranged in meshed engagement with the sun gear individual to the secondary rotor, a hydraulic brake system for locking the driven shaft to said casing means when fluid pressure is applied thereto, and a centrifugally responsive rotary fluid pump arranged to be driven by the primary rotor for supplying said fluid pressure to the brake system until the speed of rotation of the primary rotor is increased in excess of a predetermined value.

3. A torque converter of the character disclosed comprising, in combination, coaxially arranged drive and driven shafts, coacting primary and secondary rotors arranged concentrically of said shafts and having adjacently disposed coacting fluid gripping surfaces for developing a fluid driving connection therebetween in response to an increase in the speed of rotation of the primary rotor, a quantity of driving fluid, a casing having means for rotatively suporting said shafts and said rotors therein and having said quantity of driving fluid enclosed therewithin, a plurality of sun gears secured respectively to said shafts and to the secondary rotor for rotation therewith, first and second planetary gears rotatively carried by the primary rotor for rotation as a unit thereon and meshed respectively with the sun gear individual to the secondary rotor and with the sun gear individual to the driven shaft, an idler gear rotatively supported on the primary rotor and interposed between said planetary gear and said drive shaft sun gear in meshed engagement therewith, a cylinder secured to said casing eccentrically with respect to the axis of rotation of the shafts, a fluid pump housing arranged concentrically with respect to said shafts and enclosing said eccentric cylinder, said housing being secured to the primary rotor for rotation therewith and having a plurality of radially disposed piston guides, a plurality of pistons arranged respectively within said piston guides, spring means individual to said pistons and guides for yieldably urging the pistons into engagement with the peripheral surface of said eccentric cylinder, means forming an oil sump in said casing, means forming an inlet port for admitting oil from the sump into said housing between the pistons therein, a two way valve having two positions, a fluid outlet connection for passing fluid compressed by said pistons to said valve, a brake drum carried by the driven shaft, coacting brake shoes carried by said casing, a hydraulic brake cylinder carried by the casing and arranged to move said shoes into engagement with the drum in response to fluid pressure applied to the cylinder, a fluid connection interconnecting said cylinder and said valve for applying said fluid pressure to the brake cylinder from said outlet connection when the valve is in one of the two positions thereof, and a fluid connection interconnecting said valve and said sump for passing the pumped fluid from said outlet connection and from said brake cylinder to the sump when the valve is in the other position thereof.

4. A torque converter as in claim 3, and further characterized by the provision of a spring controlled fluid pressure release valve and a fluid connection having said release valve therein and extended from the sump to said fluid connection between the valve and said brake cylinder thereby to avoid excessive pressure on the brake cylinder prior to radial outward movement of the pistons in response to centrifugal force thereon as the pistons rotate around the eccentric cylinder.

5. A torque converter of the character disclosed comprising, in combination, coaxially arranged drive and driven shafts, means including an epicyclic gear train interconnecting said shafts for developing a fluid driving connection therebetween effective to vary the ratio of torque conversion from the drive to the driven shaft in accordance with the speed of rotation of the drive shaft, said epicyclic gear train including a carrier having a speed of rotation controlled by the speed of rotation of the drive shaft and the amount of slip in said fluid connection, centrifugally responsive rotary fluid pump means driven by said carrier for developing fluid pressure until the speed of rotation of the carrier is increased to a predetermined value, and hydraulic brake means controlled by the fluid pressure developed by said pump means for locking the driven shaft against rotation until the carrier speed exceeds said predetermined value.

EMERY L. FOSTER.

REFERENCES CITED

The following references are of record in the file of this patent:

UNITED STATES PATENTS

| Number | Name | Date |
|---|---|---|
| 2,081,863 | Duffield | May 25, 1937 |
| 2,263,707 | Stugl | Nov. 25, 1941 |
| 2,327,238 | Baggott | Aug. 17, 1943 |
| 2,377,696 | Kelley | June 5, 1945 |

FOREIGN PATENTS

| Number | Country | Date |
|---|---|---|
| 124,323 | Great Britain | Mar. 27, 1919 |
| 601,303 | Great Britain | May 4, 1948 |